US011422899B2

(12) United States Patent
Appireddygari Venkataramana et al.

(10) Patent No.: US 11,422,899 B2
(45) Date of Patent: Aug. 23, 2022

(54) SYSTEM AND METHOD FOR AN APPLICATION CONTAINER EVALUATION BASED ON CONTAINER EVENTS

(71) Applicant: EMC IP Holding Company LLC, Hopkinton, MA (US)

(72) Inventors: Mahesh Reddy Appireddygari Venkataramana, Bangalore (IN); Shelesh Chopra, Bangalore (IN); Chetan Battal, Bangalore (IN); Swaroop Shankar D H, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 117 days.

(21) Appl. No.: 16/925,598

(22) Filed: Jul. 10, 2020

(65) Prior Publication Data

US 2021/0374014 A1 Dec. 2, 2021

(30) Foreign Application Priority Data

May 27, 2020 (IN) .............................. 202041022178

(51) Int. Cl.
*G06F 12/00* (2006.01)
*G06F 11/14* (2006.01)

(52) U.S. Cl.
CPC ...... *G06F 11/1461* (2013.01); *G06F 11/1451* (2013.01); *G06F 11/1464* (2013.01); *G06F 11/1469* (2013.01)

(58) Field of Classification Search
CPC ............ G06F 11/1461; G06F 11/1451; G06F 11/1464; G06F 11/1469; G06F 3/0646; G06F 3/0647; G06F 3/065
See application file for complete search history.

(56) References Cited

U.S. PATENT DOCUMENTS 10,936,192 B2 * 3/2021 Krasner ................ G06F 3/0689
10,992,748 B1 * 4/2021 Hrebicek ............ H04L 67/1095

* cited by examiner

*Primary Examiner* — Shawn X Gu
(74) *Attorney, Agent, or Firm* — Chamberlain, Hrdlicka, White, Williams & Aughtry (57) ABSTRACT

A method for a backup operation in accordance with one or more embodiments of the invention includes obtaining, by a vulnerability analyzer executing on a backup server, a plurality of container event entries, wherein a container event entry of the plurality of container event entries specifies a an application container identifier, a container event identifier, an event severity, and an event type, selecting the container event identifier, identifying a portion of the plurality of container event entries that specify the container event identifier, generating a mean event severity based on the portion of the plurality of container event entries, generating a first vulnerability value associated with the application container identifier, and initiating a backup policy update based on a vulnerability ranking, wherein the vulnerability ranking is based on the first vulnerability value.

20 Claims, 6 Drawing Sheets

SYSTEM AND METHOD FOR AN APPLICATION CONTAINER EVALUATION BASED ON CONTAINER EVENTS

BACKGROUND

Computing devices may include any number of internal components such as processors, memory, and persistent storage. Each of the internal components of a computing device may be used to generate data and to execute functions. The process of generating, storing, and sending data may utilize computing resources of the computing devices such as processing and storage. The utilization of the aforementioned computing resources to generate data and to send data to other computing devices may impact the overall performance of the computing resources.

SUMMARY

In general, in one aspect, the invention relates to a method for performing backup operations. The method includes obtaining, by a vulnerability analyzer executing on a backup server, a plurality of container event entries, wherein a container event entry of the plurality of container event entries specifies a an application container identifier, a container event identifier, an event severity, and an event type, selecting the container event identifier, identifying a portion of the plurality of container event entries that specify the container event identifier, generating a mean event severity based on the portion of the plurality of container event entries, generating a first vulnerability value associated with the application container identifier, and initiating a backup policy update based on a vulnerability ranking, wherein the vulnerability ranking is based on the first vulnerability value.

In general, in one aspect, the invention relates to a system that includes a processor and memory that includes instructions which, when executed by the processor, perform a method. The method includes obtaining, by a vulnerability analyzer executing on a backup server, a plurality of container event entries, wherein a container event entry of the plurality of container event entries specifies a an application container identifier, a container event identifier, an event severity, and an event type, selecting the container event identifier, identifying a portion of the plurality of container event entries that specify the container event identifier, generating a mean event severity based on the portion of the plurality of container event entries, generating a first vulnerability value associated with the application container identifier, and initiating a backup policy update based on a vulnerability ranking, wherein the vulnerability ranking is based on the first vulnerability value.

In general, in one aspect, the invention relates to a non-transitory computer readable medium that includes computer readable program code, which when executed by a computer processor enables the computer processor to perform a method for performing backup operations. The method includes obtaining, by a vulnerability analyzer executing on a backup server, a plurality of container event entries, wherein a container event entry of the plurality of container event entries specifies a an application container identifier, a container event identifier, an event severity, and an event type, selecting the container event identifier, identifying a portion of the plurality of container event entries that specify the container event identifier, generating a mean event severity based on the portion of the plurality of container event entries, generating a first vulnerability value associated with the application container identifier, and initiating a backup policy update based on a vulnerability ranking, wherein the vulnerability ranking is based on the first vulnerability value.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, one or more embodiments of the invention relates to evaluating application containers based on events occurring on the containers. Embodiments of the invention may include tracking the events in an application container and storing container event entries in an occurrence database. A vulnerability analyzer may evaluate the container events (e.g., a number of container events associated with an application container and a severity associated with the container event) to determine a vulnerability of the application containers. The vulnerability of the application containers may be used to modify backup policies associated with the application containers.

Figure 1:
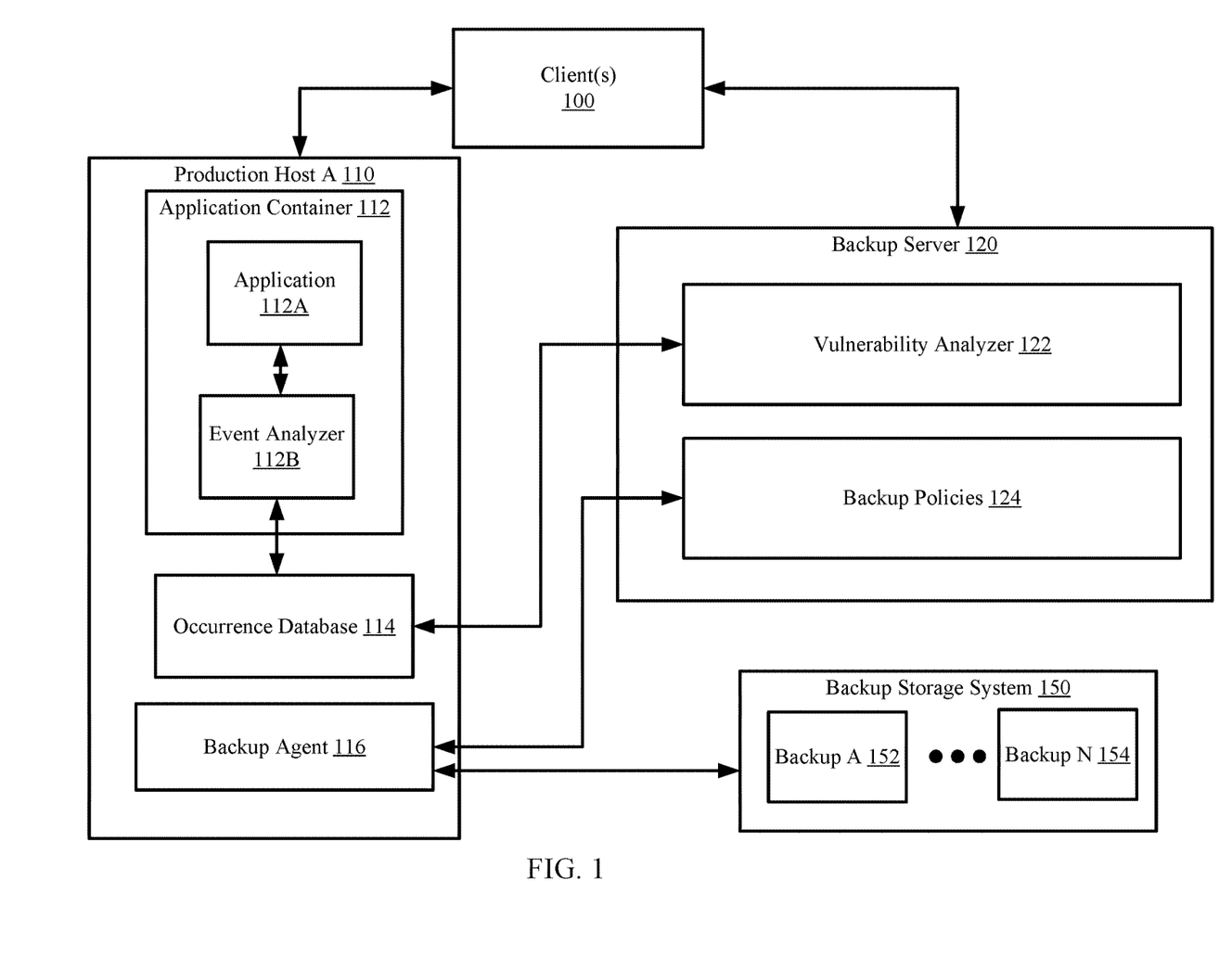
FIG. 1 shows a diagram of a system in accordance with one or more embodiments of the invention.

FIG. 1 shows a diagram of a system in accordance with one or more embodiments of the invention. The system may include one or more clients (100), a production host (110), a backup server (120), and a backup storage system (150). The system may include additional, fewer, and/or different components without departing from the invention. Each component may be operably connected to any of the other components via any combination of wired and/or wireless connections. Each of the aforementioned components is discussed below.

In one or more embodiments of the invention, the production host (110) stores application containers (e.g., 112). The application containers (e.g., 112) may be logical entities that are executed using computing resources (not shown) of the production host (110). An application container (112) may include an application (e.g., 112A). Each of the applications (e.g., 112A) hosted by the production host (110) may be performing similar or different processes. In one or more embodiments of the invention, the application (112A) provides services to users, e.g., clients (100). For example, the application (112A) may host components. The components may be, for example, instances of databases, email servers, and/or other applications. The application (112A) may host other types of components without departing from the invention. While the production host is illustrated to include one application container (112), the production host may include multiple application containers without departing from the invention. Further, while the application container (112) is illustrated to include an application (112A), the application container (112) may include multiple applications without departing from the invention. The discussion of the application container (112) throughout this application may apply to any application container hosted by the production host (110).

While the system of FIG. 1 and the discussion of the application container (112) throughout this application may specify that the application container (112) hosts one application, those skilled in the art may appreciate that the application container may host any number of applications without departing from the invention.

In one or more embodiments of the invention, the application container (112) includes an event analyzer (112B). The event analyzer (112B) collects data that specifies any occurrences associated with the application (112A). Examples of occurrences may include, but are not limited to, an operating system failure of the application, a central processing unit (CPU) usage threshold being exceeded, a percentage threshold of storage capacity allocated to the application (112A) being exceeded, a system reboot of the application (112A) occurring, and a rate of input output operations (IOPS) reaching a predetermined critical limit.

Figure 2A:
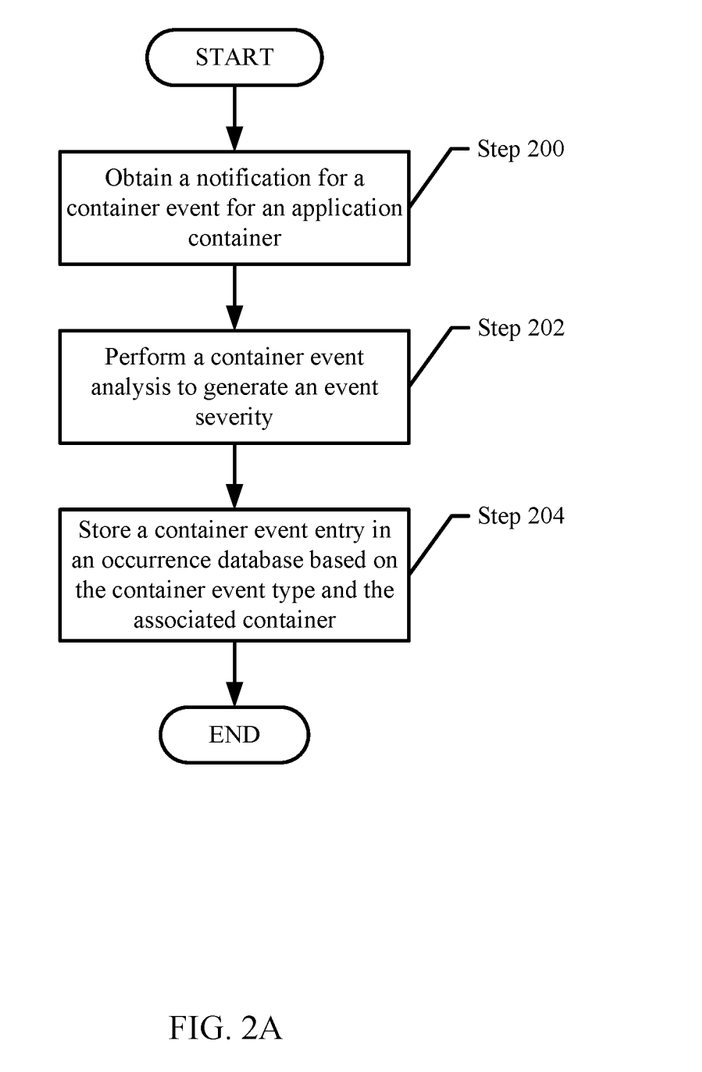
FIG. 2A shows a flowchart for processing notifications for container events in accordance with one or more embodiments of the invention.

Any occurrences detected by the event analyzer (112B) may be processed, e.g., in accordance with FIG. 2A. The occurrences may be processed via any other method without departing from the invention.

In one or more embodiments of the invention, the processing of an occurrence may result in a container event entry being stored in the occurrence database (114). In one or more embodiments of the invention, the occurrence database (114) stores container event entries that are accessed and/or analyzed by the backup server (120). Each container event entry (not shown) may include at least an application identifier, a container event type, a container event identifier, and an event severity.

In one or more embodiments of the invention, the application identifier is a combination of letters, numbers, and or symbols that uniquely identifies an application (e.g., 112A) in the production host (110). The application identifier is used to specify the application and/or the application container (e.g., 112).

In one or more embodiments of the invention, the container event type is a combination of letters, numbers, and or symbols that uniquely identify a type of container event associated with the container event entry. For example, a container event of reaching a predetermined CPU threshold may be associated with one container event identifier. Further, an operating system reboot may be associated with a unique container event identifier. The container event identifier may be further unique to the predetermined threshold (e.g., a CPU threshold of 50% may be associated with a first container event identifier, and a CPU threshold of 75% may be associated with a second container event identifier).

In one or more embodiments of the invention, the container event identifier of a container event entry is a combination of letters, numbers, and or symbols that uniquely identify the container event. In one or more embodiments of the invention, the container event is unique to both: (i) the application container identifier and (ii) the container event type. In other words, different container event identifiers are stored for container event entries that specify the same container event type but different applications. Conversely, different container event identifiers are stored for container event entries that specify the same applications but different container event types.

In one or more embodiments of the invention, the event severity of a container event entry is a numerical value associated with a severity that a container event is at risk of vulnerability. The container event severity may be generated based on an event analysis performed by the event analyzer (112B) in accordance to the method illustrated in FIG. 2A. The event severity may be generated via other methods without departing from the invention.

In one or more embodiments of the invention, the application container (112) is implemented as computer instructions, e.g., computer code, stored on a persistent storage (e.g., on the production host (110)) that when executed by a processor(s) of the production host (110) cause the production host (110) to provide the functionality of the application container (112) described throughout this application.

In one or more embodiments of the invention, the production host (110) includes a backup agent (116). The backup agent may include functionality for generating backups of and/or data objects of the application container (112). The data objects may be, for example, documents, files, collections of files, and/or other portions of data that may be associated with a classification tag. Further, the backup agent (116) may include functionality for sending the backups to the backup storage system (150).

In one or more embodiments of the invention, the backup agent (116) may generate the backups based on backup policies (124). The backup policies may specify a schedule in which an application container (e.g., 112) is to be backed up. The backup agent (116) may be triggered to execute a backup in response to a backup policy.

In one or more embodiments of the invention, the backup agent (116) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup agent (116) described throughout this application.

In one or more of embodiments of the invention, the backup agent (116) is implemented as computer instructions, e.g., computer code, stored on a persistent storage that when executed by a processor of the production host (110) causes the production host (110) to provide the functionality of the backup agent (116) described throughout this application.

Figure 4:
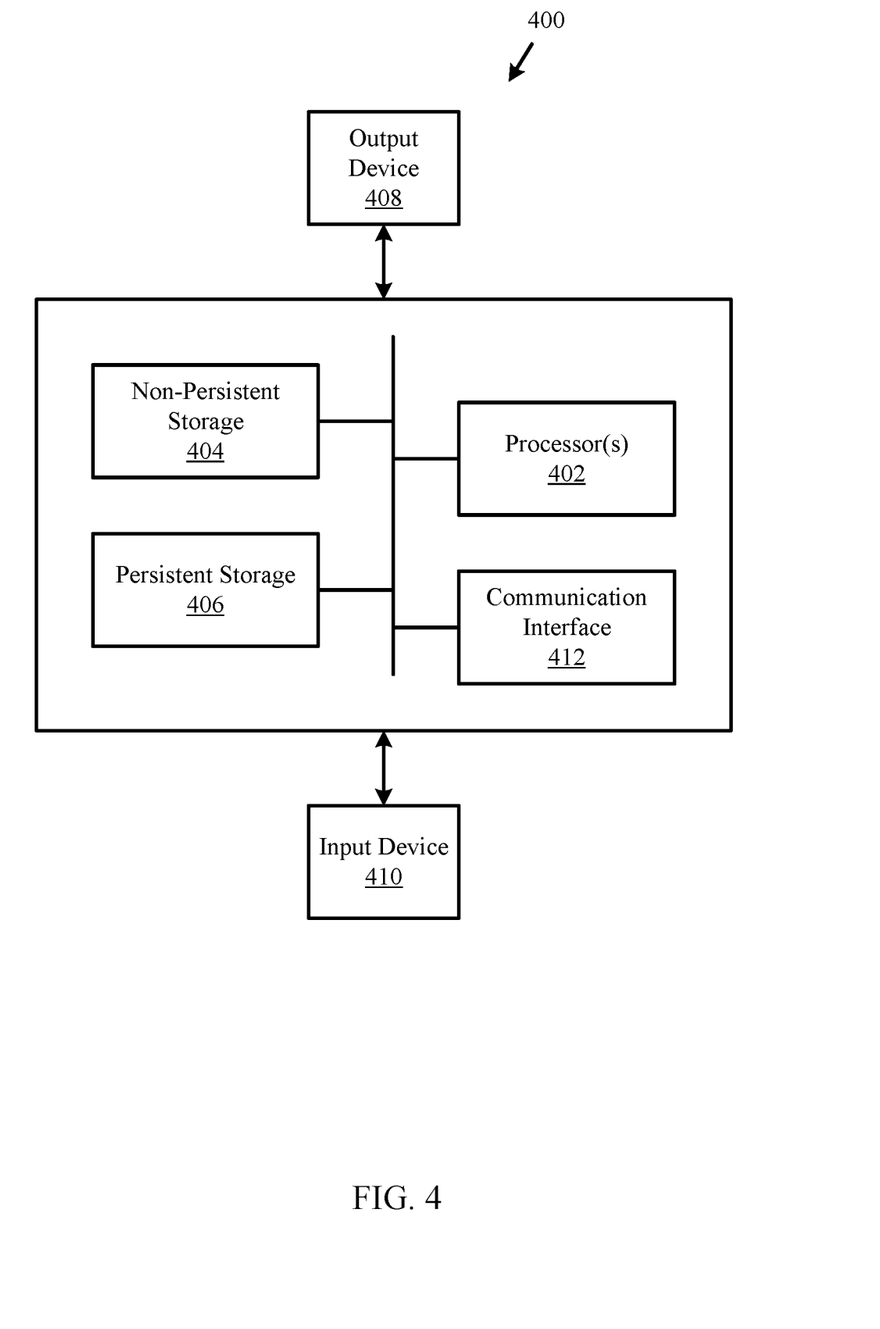
FIG. 4 shows a diagram of a computing device in accordance with one or more embodiments of the invention.

In one or more embodiments of the invention, the production host (110) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host (110) described throughout this application.

In one or more embodiments of the invention, the production host (110) is implemented as a logical device. The logical device may utilize the computing resources of any number of computing devices and thereby provide the functionality of the production host (110) described throughout this application.

In one or more embodiments of the invention, the backup server (120) manages the operation of generating backups of application containers (e.g., 112). To perform the aforementioned functionality, the backup server (120) may include a vulnerability analyzer (122) and backup policies. The backup server (120) may include additional, fewer, and/or different components without departing from the invention. Each of the aforementioned components are discussed below.

In one or more embodiments of the invention, the vulnerability analyzer (122) processes obtained container event entries (e.g., obtained from the occurrence database (114). The container event entries may be processed in accordance with FIG. 2B.

Figure 2B:
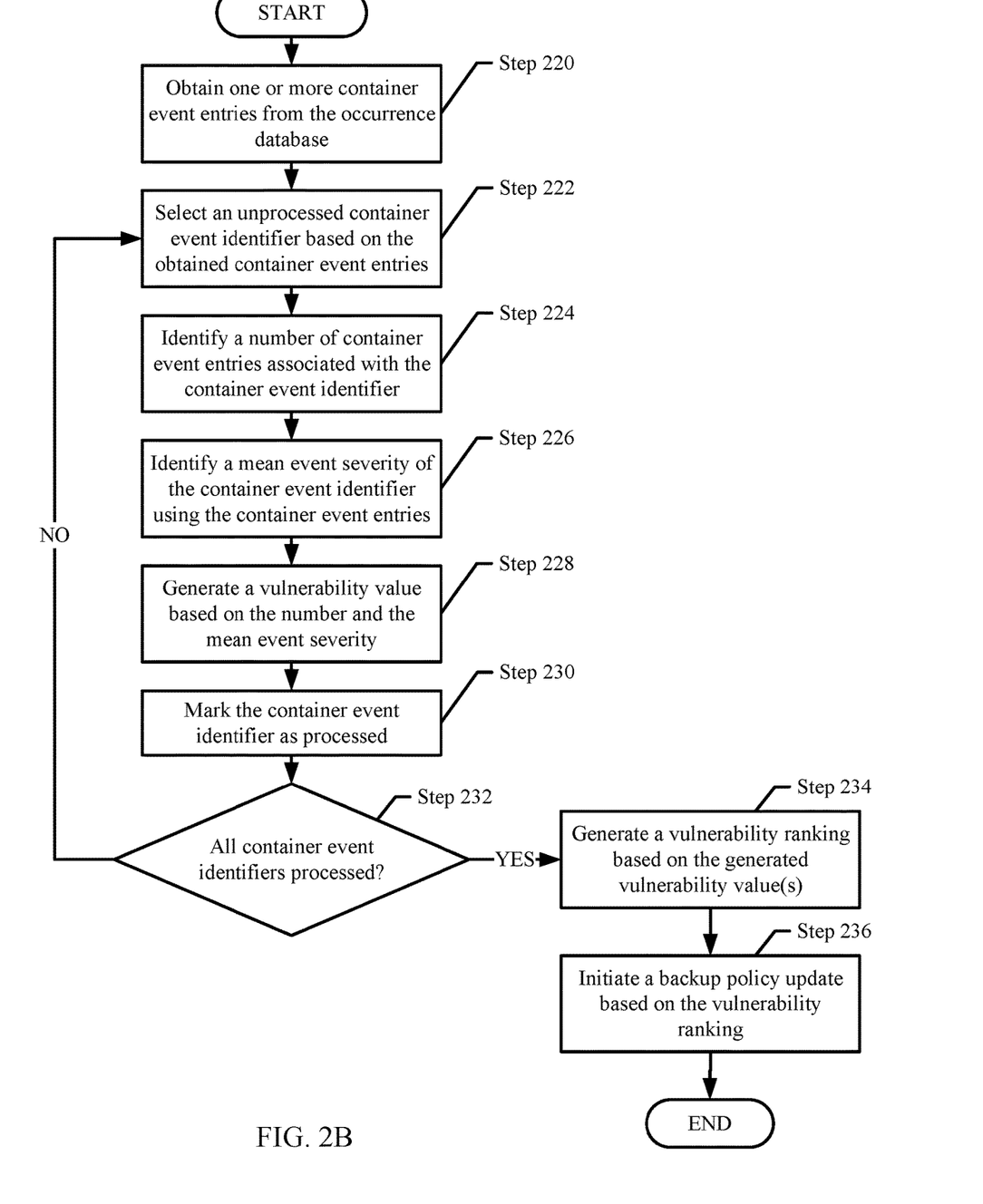
FIG. 2B shows a flowchart for updating backup policies in accordance with one or more embodiments of the invention.

In one or more embodiments of the invention, the vulnerability analyzer (122) is implemented as computer instructions, e.g., computer code, stored on a persistent storage that when executed by a processor of the backup server (120) causes the backup server (120) to provide the functionality of the vulnerability analyzer (122) described throughout this application and/or all, or a portion thereof, of the method illustrated in FIG. 2B.

In one or more embodiments of the invention, the backup policies (124) are data structures that specify a schedule for backing up the application container(s) (e.g., 112). The schedule may be set and/or modified by the vulnerability analyzer (122) in response to vulnerability tags associated with the corresponding application containers. Alternatively, or additionally, the schedule of a backup policy may be modified by an administrator of the backup server (120) in response to such vulnerability tags.

In one or more embodiments of the invention, the backup server (120) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup server (120) described throughout this application.

In one or more embodiments of the invention, the backup server (120) is implemented as a logical device. The logical device may utilize the computing resources of any number of computing devices and thereby provide the functionality of the backup server (120) described throughout this application.

In one or more embodiments of the invention, the client(s) (100) utilize services provided by the production host (110), and/or the backup server (120). Specifically, the client(s) (100) may utilize the application containers (112) to obtain, modify, and/or store data. The data may be generated from applications (e.g., 112A) hosted in the application container (112). Further, the client(s) (100) may utilize the backup server (120) to initiate backups of the application containers (e.g., 112). The client(s) (100) may trigger a backup operation performed by the backup server (120) by sending a backup request to the backup agent (116) that specifies backing up the application container (112).

In one or more embodiments of the invention, a client (100) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client (100) described throughout this application.

In one or more embodiments of the invention, the client(s) (100) are implemented as a logical device. The logical device may utilize the computing resources of any number of computing devices and thereby provide the functionality of the client(s) (100) described throughout this application.

In one or more embodiments of the invention, the backup storage system (150) store backups of data objects associated with the application containers. In one or more embodiments of the invention, a backup is a copy of a data object to be stored in a backup storage system (150).

In one or more embodiments of the invention, the backup storage system (150) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup storage system (150) described throughout this application.

In one or more embodiments of the invention, the backup storage system (150) is implemented as a logical device. The logical device may utilize the computing resources of any number of computing devices and thereby provide the functionality of the backup storage system (150) described throughout this application.

FIGS. 2A-2B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2B may be performed in parallel with any other steps shown in FIGS. 2A-2B without departing from the scope of the invention.

FIG. 2A shows a flowchart for generating classification tags in accordance with one or more embodiments of the invention. The method shown in FIG. 2A may be performed by, for example, an event analyzer (112B, FIG. 1). Other components of the system illustrated in FIG. 1 may perform the method of FIG. 2A without departing from the invention.

In step 200, a notification for a container event of an application container is obtained. In one or more embodiments of the invention, the notification may specify the container event and the application container to which the container event applies. The notification may be obtained as a message sent by the application to the event analyzer. Alternatively, the notification may be obtained based on a periodic monitoring performed on the application by the event analyzer.

For example, the monitoring may include monitoring storage allocated to the application and identifying a storage capacity usage of the application and whether the storage capacity usage exceeds a storage capacity threshold. The determination that the storage capacity usage exceeds a storage capacity threshold may result in obtaining a notification of a container event that the application has exceeded the storage capacity usage threshold.

In step 202, a container event analysis is performed on the container event to generate an event severity. In one or more embodiments of the invention, the event severity specifies the severity in which a container event is likely to negatively impact an application, an application container, a production host, and/or a system in which the application is operating. The event severity may be implemented as, for example, a numerical value. The event severity may be implemented via any other implementations without departing from the inventions.

In one or more embodiments of the invention, the container event analysis is performed based on a number of characteristics associated with the container event. For example, a container event type may be identified (e.g., a CPU threshold is reached, a reboot of an application has occurred, etc.) and used for the container event analysis.

Further, the application container associated with the notification may be identified for the container analysis. For example, a criticality and/or sensitivity of the application may be identified to determine an event severity (e.g., an application with a high criticality may be associated with a high event severity, and an application with a low criticality may be associated with a low event severity, etc.). In one or more embodiments of the invention, a criticality is a numerical value that is associated with how sensitive the data generated by the application is. Highly sensitive data may be data in which, for example private user information is specified. Low sensitive data may be data where there is fewer security risks if such data became public information. Other characteristics of the application container and/or of the container event may be used for the container event analysis without departing from the invention.

In step 204, a container event entry is stored in an occurrence database based on the container event type and the associated application container. In one or more embodiments of the invention, the container event entry specifies the application container (e.g., via an application container identifier), the container event, a container event type, and the event severity generated in step 202.

FIG. 2B shows a flowchart for generating classification tags in accordance with one or more embodiments of the invention. The method shown in FIG. 2B may be performed by, for example, a vulnerability analyzer (122, FIG. 1). Other components of the system illustrated in FIG. 1 may perform the method of FIG. 2B without departing from the invention.

In step 220, container event entries are obtained from the occurrence database. In one or more embodiments of the invention, the container event entries are obtained based on a policy implemented by the vulnerability analyzer. The policy may specify, for example, a container event threshold reached by a number of container event entries stored in the occurrence database. Alternatively, the policy may specify a schedule in which the vulnerability analyzer is to implement. The schedule may specify when the vulnerability analyzer is to periodically obtain any container event entries in the occurrence database.

In step 222, an unprocessed container event identifier is selected based on the obtained container event entries. The unprocessed container event identifier may be selected based on the obtained container event entries. Specifically, the selected container event identifier may be a container event identifier that is specified in at least one of the container event entries.

In step 224, a number of container event entries associated with the container event identifier is identified. In one or more embodiments of the invention, the number is identified by analyzing the container event entries and counting the number of container event entries that specify the container event identifier. As discussed above, the container event identifier is uniquely associated with one container event occurring on a specified application or application container. As such, the identified number is associated with a number of times that an application (or application container) undergoes a specific event occurrence.

In step 226, a mean event severity of the container event identifier is identified using the container event entries. In one or more embodiments of the invention, the mean event severity is an output to a function that utilizes the event severity of each application container that specifies the selected container event identifier. The function may include, for example, an average of the event severities. The function may include other operations performed on each event severity without departing from the invention.

In step 228, a vulnerability value is generated based on the number and the mean event severity. In one or more embodiments of the invention, the vulnerability value is a result of a second function that utilizes the mean event severity and the identified number. The second function may include, for example, applying a weightage to the number and the mean event severity and multiplying the weighted number and weighted mean event severity. The second function may include other operations performed on the identified number and the mean event severity without departing from the invention.

In step 230, the container event identifier is marked as processed.

In step 232, a determination is made about whether all container event identifiers associated with the obtained container events are processed. If all container event identifiers are processed, the method proceeds to step 234. Otherwise, the method proceeds to step 222.

In step 234, a vulnerability ranking is generated based on the generated vulnerability value(s). In one or more embodiments of the invention, each vulnerability value generated for each container event identifier is compared to each other to determine a ranking of vulnerability for each application container specified in the obtained container event entries. For example, the container event identifier with the highest vulnerability value is used to rank the associated application container with a highest vulnerability. Subsequently, any next highest vulnerability values are used to rank the corresponding application container as next highest, etc. The vulnerability ranking may be an ordering of the unique application containers. Alternatively, the vulnerability ranking may be a list of the application containers and a numerical rank associated with the application container.

In step 236, a backup policy update is initiated based on the vulnerability ranking. In one or more embodiments of the invention, the backup policy update includes modifying the schedule of each application container specified in the vulnerability ranking. The backup policy may be updated by increasing the period for backing up application containers associated with higher vulnerability values in relation to other application containers specified in the vulnerability ranking. Further, the backup policy may be updated by decreasing the period for backing up application containers associated with lower vulnerability values.

EXAMPLE

Figure 3A:
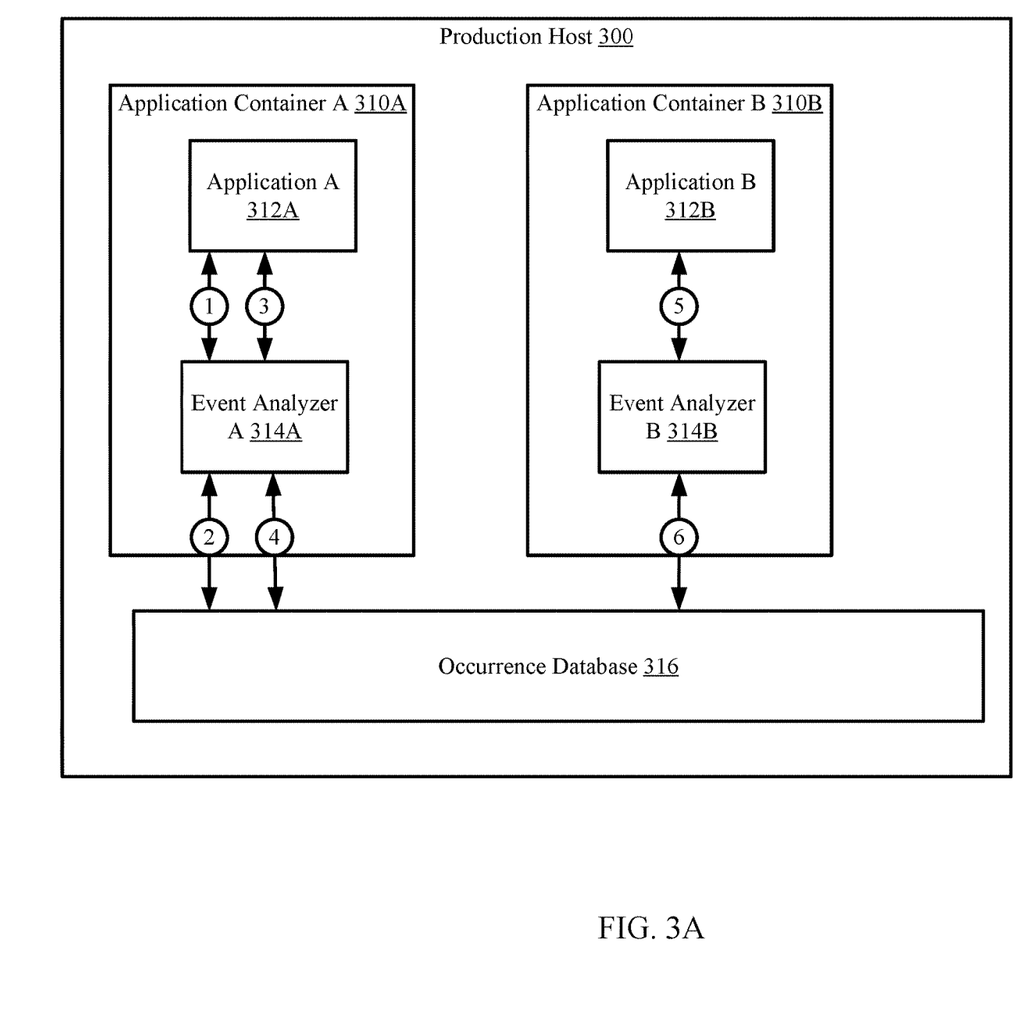
FIGS. 3A-3B show an example in accordance with one or more embodiments of the invention.
Figure 3B:
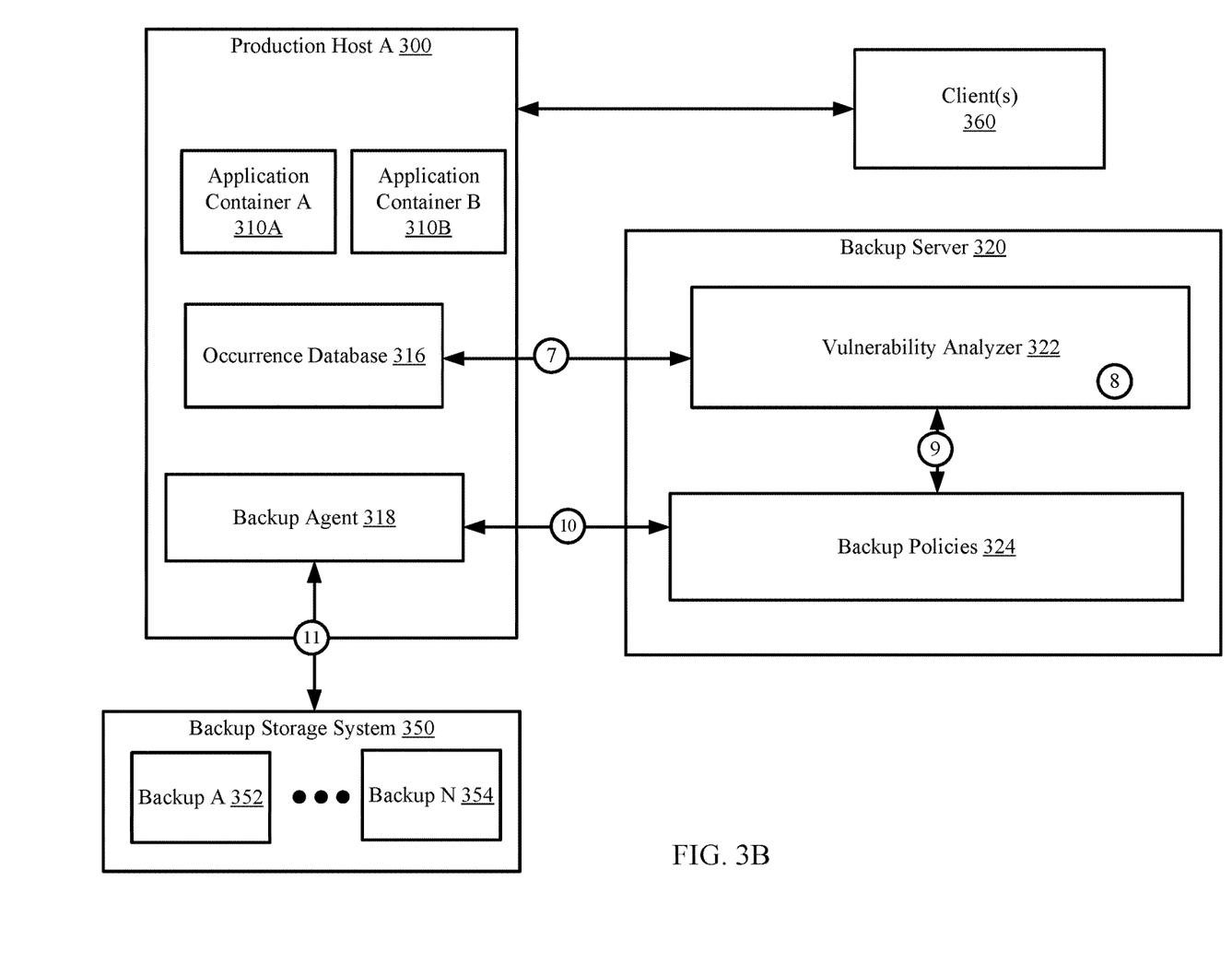

The following section describes an example. The example, illustrated in FIGS. 3A-3B, is not intended to limit the invention. Turning to the example, consider a scenario in which a system is monitoring events occurring in application containers hosted by a production host.

FIG. 3A shows an example system. The example system includes a production host (300) that includes two application containers (310A, 310B) that are monitored by event analyzers (314A, 314B). Application A (312A) is monitored by event analyzer A (314A) and application B (312B) is monitored by event analyzer B (314B).

Application A (312A) undergoes an unexpected reboot. Event analyzer (314A) detects the reboot and performs the method of FIG. 2A to generate a container event entry [1] [2]. The container event entry specifies the container event type (e.g., the reboot), application A (312A), and a container event identifier (i.e., AA111) that is associated with the container event occurring on application A (312A). The container event type further includes an event severity of seven. The event severities may be numerical values out of ten.

Application A (312A) undergoes a second unexpected reboot. Event analyzer (314A) detects the second reboot and performs the method of FIG. 2A to generate a second container event entry [3] [4]. The second container event entry specifies the container event type (e.g., the reboot), application A (312A), and the container event identifier AA111 (similar to that of the first container event entry) that is associated with the container event occurring on application A (312A). The container event type further includes an event severity of seven (similar to that of the first event severity).

Application B (312B) reaches a predetermined CPU threshold. Event analyzer B (314B) detects the CPU threshold reached and performs the method of FIG. 2A to generate a third container event entry [5] [6]. The third container event entry specifies the container event type (e.g., the CPU reaching a threshold), application B (312B), and a container event identifier (i.e., BB123) that is associated with the container event occurring on application B (312B). The container event type further includes an event severity of four.

FIG. 3B shows the example system at a later point in time. The example system further includes a backup server (320) and a backup storage system (350). A policy (different from the backup policies (324)) implemented by a vulnerability analyzer (322) of the backup server (320) specifies obtaining any container event entries from the occurrence database after every five minutes.

The vulnerability analyzer (322) obtains the three container event entries stored in the occurrence database (316) [7] and performs the method of FIG. 2B to analyze the container event entries [8]. Specifically, the vulnerability analyzer selects a first container event identifier specified in the container event entries. The first selected container event identifier is AA111. The vulnerability analyzer (322) identifies the two container event entries associated with the container event identifier and generates a mean event severity of seven by identifying the average of the two event severities associated with the two container event entries. Further, the number of two is used with the mean severity of seven to identify a vulnerability value. The vulnerability value is generated by multiplying the number by a first weight of 0.8 to the number of container entries (i.e., two) to get a weighted number of 1.6. A second weight of 1.5 is multiplied by the mean severity of seven to get a weighted mean event severity of 10.5. The weighted mean severity and the weighted number are further multiplied to get 16.8.

The vulnerability analyzer (322) selects the second container event identifier (i.e., BB123) and identifies a number of container events that specify the second container event identifier. The identified number is one. The vulnerability analyzer (322) performs the method of FIG. 2B to generate a vulnerability value for the second container event identifier. Specifically, the number of one is multiplied by the first weight to get a weighted number of 0.8. The mean event severity of three associated with the container event identifier is multiplied by the second weight to get a weighted mean severity of 4.5. The weighted mean severity and the weighted number are multiplied to get a vulnerability value of 3.6.

The vulnerability values are used to rank the two container event identifiers in a vulnerability ranking. The vulnerability value of AA111 is used to rank application container A (310A) as highest vulnerability. Further, the vulnerability value of BB123 is used to rank application container B (310B) as lowest vulnerability.

The vulnerability ranking generated by the vulnerability analyzer (322) is used to update backup policies (324). The backup policies are updated to increase a default schedule for backing up application container A (310A) and to decrease a default schedule for backing up application container B (310B). In this manner, the more vulnerable application (i.e., application A) is more strongly protected than application B.

At a later point in time, a backup agent (318) implements the backup policies (324) [10]. Specifically, the backup agent (318) initiates a backup of application container A (310A) based on the schedule, and stores the backup in the backup storage system (350).

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the efficiency of performing backups of applications by identifying application containers that are more vulnerable to events that may cause a loss of data and enhancing the backup policies of such application containers so that they are more likely to be backed up. In this manner, the more vulnerable applications are better protected. Further, less vulnerable application containers are less likely to be backed up based on fewer events and/or less severe events occurring on those application containers. In this manner, the computing resources being used to back up a system of application containers are more efficiently utilized.

Thus, embodiments of the invention may address the problem of inefficient use of computing resources. This problem arises due to the technological nature of the environment in which backup operations are performed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing application containers, the method comprising:
    obtaining, by a vulnerability analyzer executing on a backup server, a plurality of container event entries, wherein a container event entry of the plurality of container event entries specifies an application container identifier, a container event identifier, an event severity, and an event type;
    selecting the container event identifier;
    identifying a portion of the plurality of container event entries that specify the container event identifier;
    generating a mean event severity based on the portion of the plurality of container event entries;
    generating a first vulnerability value associated with the application container identifier; and
    initiating a backup policy update based on a vulnerability ranking,
    wherein the vulnerability ranking is based on the first vulnerability value.

2. The method of claim 1, further comprising:
    selecting a second container event identifier;
    identifying a second portion of the plurality of container event entries that specify the second container event identifier;
    generating a second mean event severity based on the second portion of the plurality of container event entries;
    generating a second vulnerability value associated with a second application container identifier;
    generating a second vulnerability ranking based on the first vulnerability value and the second vulnerability value; and
    initiating a second backup policy update based on the second vulnerability ranking.

3. The method of claim 1, wherein the container event identifier is based on both the event type and the application container identifier.

4. The method of claim 1, wherein the plurality of container event entries are obtained from an occurrence database.

5. The method of claim 4, wherein the occurrence database is stored in a production host executing an application container associated with the application container identifier.

6. The method of claim 1, wherein initiating the backup policy update comprises updating a backup schedule of an application container associated with the application container identifier.

7. The method of claim 1, wherein the first vulnerability value is a numerical value.

8. A system, comprising:
    a processor; and
    memory comprising instructions which, when executed by the processor, perform a method, the method comprising:
        obtaining, by a vulnerability analyzer executing on a backup server, a plurality of container event entries, wherein a container event entry of the plurality of container event entries specifies an application container identifier, a container event identifier, an event severity, and an event type;
selecting the container event identifier;
identifying a portion of the plurality of container event entries that specify the container event identifier;
generating a mean event severity based on the portion of the plurality of container event entries;
generating a first vulnerability value associated with the application container identifier; and
initiating a backup policy update based on a vulnerability ranking,
wherein the vulnerability ranking is based on the first vulnerability value.

9. The system of claim 8, the method further comprising:
selecting a second container event identifier;
identifying a second portion of the plurality of container event entries that specify the second container event identifier;
generating a second mean event severity based on the second portion of the plurality of container event entries;
generating a second vulnerability value associated with a second application container identifier;
generating a second vulnerability ranking based on the first vulnerability value and the second vulnerability value; and
initiating a second backup policy update based on the second vulnerability ranking.

10. The system of claim 8, wherein the container event identifier is based on both the event type and the application container identifier.

11. The system of claim 8, wherein the plurality of container event entries are obtained from an occurrence database.

12. The system of claim 11, wherein the occurrence database is stored in a production host executing an application container associated with the application container identifier.

13. The system of claim 8, wherein initiating the backup policy update comprises updating a backup schedule of an application container associated with the application container identifier.

14. The system of claim 13, wherein the first vulnerability value is a numerical value.

15. A non-transitory computer readable medium comprising computer readable program code, which when executed by a computer processor enables the computer processor to perform a method, the method comprising:

obtaining, by a vulnerability analyzer executing on a backup server, a plurality of container event entries, wherein a container event entry of the plurality of container event entries specifies an application container identifier, a container event identifier, an event severity, and an event type;
selecting the container event identifier;
identifying a portion of the plurality of container event entries that specify the container event identifier;
generating a mean event severity based on the portion of the plurality of container event entries;
generating a first vulnerability value associated with the application container identifier; and
initiating a backup policy update based on a vulnerability ranking,
wherein the vulnerability ranking is based on the first vulnerability value.

16. The non-transitory computer readable medium of claim 15, the method further comprising:
selecting a second container event identifier;
identifying a second portion of the plurality of container event entries that specify the second container event identifier;
generating a second mean event severity based on the second portion of the plurality of container event entries;
generating a second vulnerability value associated with a second application container identifier;
generating a second vulnerability ranking based on the first vulnerability value and the second vulnerability value; and
initiating a second backup policy update based on the second vulnerability ranking.

17. The non-transitory computer readable medium of claim 15, wherein the container event identifier is based on both the event type and the application container identifier.

18. The non-transitory computer readable medium of claim 15, wherein the plurality of container event entries are obtained from an occurrence database.

19. The non-transitory computer readable medium of claim 18, wherein the occurrence database is stored in a production host executing an application container associated with the application container identifier.

20. The non-transitory computer readable medium of claim 15, wherein initiating the backup policy update comprises updating a backup schedule of an application container associated with the application container identifier.

* * * * *